(12) United States Patent
Prasanna Kumar et al.

(10) Patent No.: US 10,262,055 B2
(45) Date of Patent: Apr. 16, 2019

(54) SELECTION OF DATA STORAGE SETTINGS FOR AN APPLICATION

(71) Applicant: Telefonaktiebolaget L M Ericsson (publ), Stockholm (SE)

(72) Inventors: Manoj Prasanna Kumar, Chennai (IN); N Hari Kumar, Chennai (IN); Brindha Padmanaabhan, Chennai (IN); Vikas Verma, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 610 days.

(21) Appl. No.: 14/773,221

(22) PCT Filed: Mar. 7, 2013

(86) PCT No.: PCT/SE2013/050201
§ 371 (c)(1),
(2) Date: Sep. 4, 2015

(87) PCT Pub. No.: WO2014/137258
PCT Pub. Date: Sep. 12, 2014

(65) Prior Publication Data
US 2016/0026708 A1    Jan. 28, 2016

(51) Int. Cl.
*G06F 17/30* (2006.01)
*H04L 29/08* (2006.01)

(52) U.S. Cl.
CPC .... *G06F 17/30598* (2013.01); *G06F 17/3056* (2013.01); *G06F 17/30339* (2013.01); *G06F 17/30389* (2013.01); *H04L 67/1097* (2013.01)

(58) Field of Classification Search
None
See application file for complete search history.

(56) References Cited

U.S. PATENT DOCUMENTS 5,991,751 A * 11/1999 Rivette ............. G06F 17/30716
2009/0164943 A1   6/2009 Ryan et al.
(Continued)

OTHER PUBLICATIONS

Quick Reference Guide for WEST and EAST Jun. 2005, SIRA, 2 pages.*

(Continued)

*Primary Examiner* — Jason G Liao
(74) *Attorney, Agent, or Firm* — Sage Patent Group

(57) ABSTRACT

The present disclosure is directed towards a data storage setting arrangement in a federated database system that includes applications configured to handle data in corresponding databases. The arrangement includes a communication interface for obtaining application requirement data (AIC) related to database usage, a database determining unit for predicting database type using the application requirement data and selecting database based on the database type prediction, a processing type determining unit for predicting database processing type based on the application requirement data and selecting database processing type based on the processing type prediction, a data model creating unit for creating a data model for storing of data in the database based on the application requirement data and an instantiating unit for instantiating a connection between the application and the selected database based on the selected database processing type and data model.

15 Claims, 6 Drawing Sheets

(56) References Cited

U.S. PATENT DOCUMENTS

2012/0011168 A1 1/2012 Tkachuk
2012/0102032 A1 4/2012 Byrne et al.
2012/0110021 A1 5/2012 Hryniewicki
2016/0314173 A1* 10/2016 Lydick .............. G06F 17/30483

OTHER PUBLICATIONS

Chris Adranga, Good db table design: One table mixing different entities or separate tables for each entity Sep. 24, 2010, stackoverflow, https://stackoverflow.com/questions/2356934/good-db-table-design-one-table-mixing-different-entities-or-separate-table-for.*
EAST 2.4 QRG Mar. 2009, SIRA, 2 pages.*
User's Manual for the Examiners Automated Search Tool (EAST) 2.1 May 5, 2006, Computer Sciences Corp., v1.3, 256 pages.*
Young et al, Statistical pattern Classification with Binary Variables Mar. 1981, IEEE Transactions on Pattern Analysis and Machine Intelligence, vol. PAMI-3 Iss. 2, pp. 155-163.*
EAST 3.1.1 Deployment for CPC Jan. 10, 2013, USPTO, 2 pages.*
New EAST Features Mar. 2001, USPTO Patent Search Facilities, Search Patents vol. XIII No. 3, 1 page.*
EAST Classification Window Quick Reference Guide Jan. 2, 2013, USPTO OPIM, pdf metadata + 2 pages.*
Second USPTO Cooperative Patent Classification (CPC) External User Day date unknown, https://www.uspto.gov/about-us/events/second-uspto-cooperative-patent-classification-cpc-external-user-day.*
Introduction to the Cooperative Patent Classiicaiton (CPC) Aug. 20, 2012, USPTO Patent Training Academy, 53 pages.*
Heimbinger et al., A federated architecture for information management 1985 ACM Transactions on Information Systems, vol. 3, pp. 253-278.*
Read, "MEKA: A Multi-label Extension to WEKA", downloaded May 3, 2013 from http://meka.sourceforge.net/, 2 pp.
Wikipedia, the free encyclopedia, "Federated Database system", downloaded May 3, 2013 from http://en.wikipedia.org/wiki/Federated_database_system, 6 pp.
Wikipedia, the free encyclopedia, "Online analytical processing", downloaded May 3, 2013 from http://en.wikipedia.org/wiki/Online_analytical_processing, 8 pp.
Wikipedia, the free encyclopedia, "Online transaction processing", downloaded May 3, 2013 from http://en.wikipedia.org/wiki/Online_transaction_processing, 3 pp.
International Search Report, Application No. PCT/SE2013/050201, dated Sep. 26, 2013.
Written Opinion of the International Searching Authority, Application No. PCT/SE2013/050201, dated Sep. 26, 2013.

* cited by examiner

| Element Number(s) | Description |
|---|---|
| 10 | Federated Database System |
| 12, 14, 16 | First, Second, and Third Data Handling |
| 20 | Access Handling Device |
| 22, 24, 26 | First, Second, and Third Databases |

| Element Number(s) | Description |
|---|---|
| 20 | Access Handling Device |
| 28 | First Communication Interface |
| 30 | Database Determining Unit |
| 32 | Processing Type Determining Unit |
| 34 | Data Model Creating Unit |
| 35 | Access Handling Unit |
| 36 | Instantiating Unit |
| 37 | Second Communication Interface |

SELECTION OF DATA STORAGE SETTINGS FOR AN APPLICATION

CROSS REFERENCE TO RELATED APPLICATION

This application is a 35 U.S.C. § 371 national stage application of PCT International Application No. PCT/SE2013/050201, filed on Mar. 7, 2013, the disclosure and content of which is incorporated by reference herein in its entirety. The above-referenced PCT International Application was published in the English language as International Publication No. WO 2014/137258 A1 on Sep. 12, 2014.

TECHNICAL FIELD

The invention relates to federated database systems. More particularly, the invention relates to a data storage setting arrangement in a federated database system as well as to a method, computer program and computer program product for selecting data storage settings for an application in a federated database system.

BACKGROUND

Industrial applications, such as mobile telephone systems, are becoming more complex day by day. It has become common for an application to have multiple data streams. Application data increases in size everyday. Hence, industries are more concerned in using a federated database system that contains a variety of databases that suit the needs of their application.

There may thus exist a variety of databases of different types provided in a database system of an industrial environment like a mobile telephone system. The database systems may then be divided into different levels or tiers, where there may be a data level, a data grid level and an application level and above this providing also an enterprise level.

Each application will require a processing type and a database that is suited for the type of operations it performs. For example, analytical applications with large data require an Online Analytical Processing (OLAP) kind of data processing in a distributed database such as HBase, whereas applications with continuous data streams require Online Transaction Processing (OLTP) kind of data processing. It is highly important to determine the correct kind of data processing and database for an application to efficiently store and retrieve data.

One type of database is the structured query language (SqL) type. With the growth in data size, it is necessary to migrate to distributed NoSqL kind of databases like HBase, to handle big data efficiently. Hence, it is important for a federated database system to comprise SqL and NoSqL databases to suit the needs of different application.

Data modelling is also highly important for the efficiency of applications. The conceptual, logical and physical model of an application should be carefully designed based on the underlying database. In a federated database system, this is also something that is difficult to do.

The problem is that today the determination of database type, data processing and data modelling is more or less manual, which is both time consuming and complex. This problem gets more severe the more applications are needed in a database system.

There is therefore a need for simplifying and speeding up these activities at the deployment of an application in a federated database system.

The present invention is thus directed towards simplifying the deployment of an application in a federated database system,

SUMMARY

One object of the invention is thus to simplify the deployment of an application in a federated database system.

This object is according to a first aspect achieved by a data storage setting arrangement in a federated database system, where the federated database system comprises applications handling data in corresponding databases.

The data storage setting arrangement comprises
a communication interface for obtaining application requirement data related to database usage,
a database determining unit that predicts database type using the application requirement data and selects database based on the database type prediction,
a processing type determining unit that predicts database processing type based on the application requirement data and selects database processing type based on the processing type prediction,
a data model creating unit that creates a data model for storing of data in the database based on the application requirement data, and
an instantiating unit that instantiate a connection between the application and the selected database based on the selected database processing type and data model.

This object is according to a second aspect also achieved by a method of selecting data storage settings for an application in a federated database system, which federated database system comprises applications handling data in corresponding databases. The method is performed in a data storage setting arrangement of the federated database system and comprises:
obtaining application requirement data related to database usage,
predicting database type using the application requirement data,
selecting database based on the database type prediction,
predicting database processing type based on the application requirement data,
selecting database processing type based on the processing type prediction,
creating a data model for storing of data in the database based on the application requirement data, and
instantiating a connection between the application and the selected database based on the selected database processing type and data model.

This object is according to a third aspect also achieved by a computer program for selecting data storage settings for an application in a federated database system, where the federated database system comprises applications handling data in corresponding database. The computer program comprises computer program code which when run in a data storage setting arrangement, causes the data storage setting arrangement to:
obtain application requirement data related to database usage,
predict database type using the application requirement data,
select database based on the database type prediction,
predict database processing type based on the application requirement data, select database processing type based on the processing type prediction, create a data model for storing of data in the database based on the application requirement data, and instantiate a connection between the application and the selected database based on the selected database processing type and data model.

The object is according to a fourth aspect furthermore achieved by a computer program product for selecting data storing settings for an application in a federated database system, where the computer program product is provided on a data carrier and comprises the computer program code according to the third aspect.

The invention according to the above-mentioned aspects has a number of advantages. It simplifies the deployment of an application in a federated database. The manual overhead required in defining a data model of an application may be reduced. An application developer need not worry about the database. Runtime efficiency of applications may be high because of the provided selections of database and data processing types.

In an advantageous variation of the first aspect, a prediction is made by a corresponding determining unit using a classifier with variables that are based on the application requirement data. This determining unit may furthermore be configured to train the classifier using simulated training data.

In a corresponding variation of the second aspect, a prediction is performed using a classifier with variables based on said application requirement data. The method may then further comprise training the classifier using simulated training data.

The application requirement data may comprise field names with type definitions.

According to a further variation of the first aspect, the data model creating unit, when creating a data model, may be further configured to cluster the field names according to type definitions and create a table for each cluster.

According to a corresponding variation of the second aspect, the creating of a data model comprises clustering the field names according to type definitions and creating a table for each cluster.

The application requirement data may furthermore comprises query design data.

According to yet another variation of the first aspect, the data model creating unit, when creating a data model, is configured to create tables according to logical relationships between fields described in the query design data.

According to a corresponding variation of the second aspect, the creating of a data model comprises creating tables according to logical relationships between fields described in the query design dat.

A usage profile may comprise group describing data set by the usage profile announcing device.

According to a further variation of the first aspect, the data storage setting arrangement further comprises an access handling unit configured to store data in the database using the instantiated data model and data processing type.

According to a corresponding variation of the second aspect, the method further comprises storing data in the database using the instantiated data model and data processing type.

The application requirement data may furthermore comprise access defining data and optionally relational data.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Embodiments of the invention are directed towards a federated database system where there may exist one or more applications accessing several databases. In such a system an application should not have to deal with the details of the data storing in the databases. A user, such as an application developer that deploys an application should not have to deal with the selections and designs needed for effective deployment. Embodiments described herein address this issue.

Figure 1:
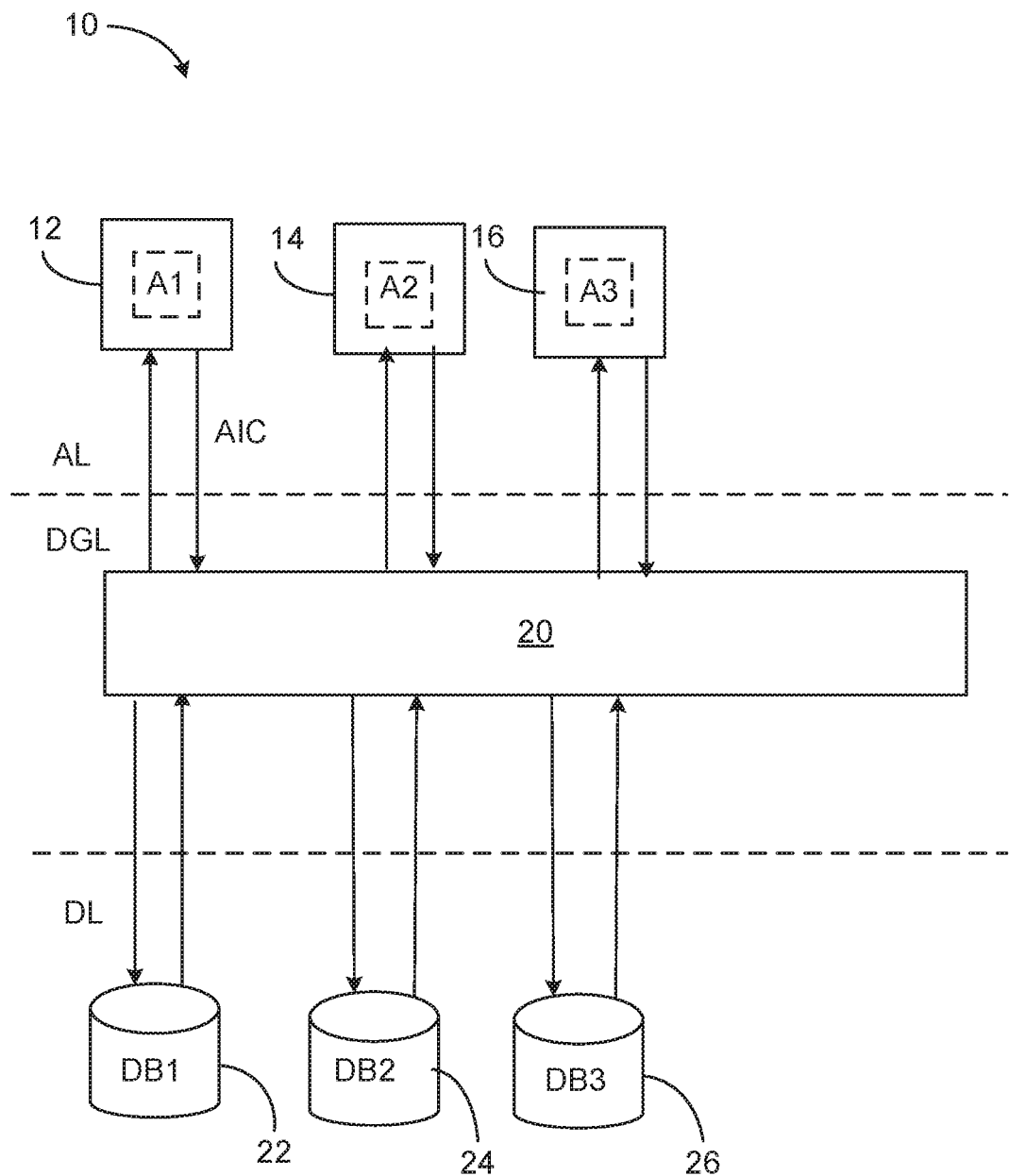
FIG. 1 schematically shows a number of data accessing devices comprising applications, an access handling device, as well as a number of databases.

In FIG. 1 there is shown a federated database system 10. The federated database system 10 may be a part of a larger system, such as a mobile communication system, like Long Term Evolution (LTE) or Wideband Code Division Multiple Access (WCDMA). A mobile communication system may furthermore comprise a radio access network and a core network, where the core network may provide core network functionality such as keeping track of mobile terminals and their locations. This type of functionality may be based on one or more home location registers (HLR) that may need to use the databases of the federated database system 10. It is also known for various types of third party application servers connecting to such a mobile communication system. Also these servers may need to employ the federated database system 10. However, it should be realized that a mobile communication system is merely one example of an industrial environment in which a federated database system may be used.

In the federated database system 10 there is a first data handling device 12, a second data handling device 14 and a third data handling device 16. In each of these data handling devices 12, 14 and 16 there is furthermore running an application which accesses a corresponding database, for instance through reading and/or storing data in the database. There is here a first application A1 in the first data handling device 12, a second application A2 in the second data handling device 14 and a third application A3 in the third data handling device 16. The data handling devices are furthermore provided in an application layer AL of the database system 10. The data handling applications are thus configured to store data in and fetch data from corresponding databases. Therefore, the first application A1 may access a first database DB1 22, the second application A2 may access a second database DB2 24 and the third application A3, may access a third database DB3 26. The first database 22 may be an Hbase database, the second database may be a PostgresSqL database and the third database may be a Grapg database. The databases 22, 24 and 26 may furthermore be provided in a data layer DL of the system. It should be realized that the database types mentioned above are merely examples of database types that may be used. In the accessing of the databases different data processing types may also be used such as Online Analytical Processing (OLAP) or Online Transaction Processing (OLTP).

The accessing of the data is furthermore performed under the mediation of an access handling device 20. The transfer of data from the applications to the databases and from the databases to the applications is thus controlled by the access handling device 20, which thus has knowledge about which application communicates with which database. As may be seen in FIG. 1, the access handling device 20 is provided in a data grid layer DGL through which data transfer between applications and databases is controlled.

The databases 22, 24 and 26 may all comprise processors such as central processing units (CPU) and data-stores in the form of memories.

Finally there is in FIG. 1 shown how the first application A1 sends an application information card AIC to the access handling device 20.

Figure 2:
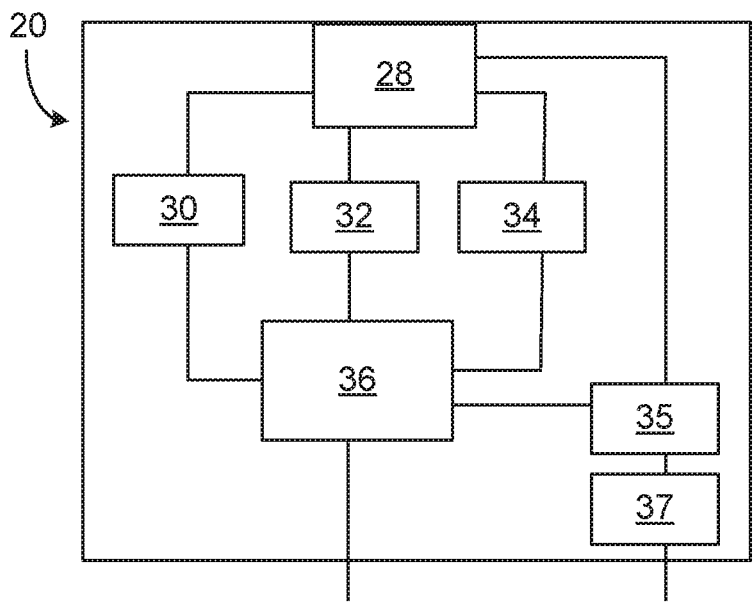
FIG. 2 shows a block schematic of the access handling device, FIG. 3 schematically shows application requirement data provided in an application information card.

FIG. 2 shows a block schematic of the access handling device 20. It comprises a first communication interface 28 for communicating with entities in the application layer like the first, second and third applications A1, A2 and A3 and a second communication interface 37 for communicating with databases. It also comprises an instantiating unit 36. The access handling device also comprises a database determining unit 32, which is connected between the first interface 28 and the instantiating unit 36, a processing type determining unit 32 connected between the first interface 28 and the instantiating unit 36, a data model creating unit 34 connected between the first interface 28 and the instantiating unit 36. Finally there is also an access handling unit 35 connected between the first and the second interfaces 28 and 37 as well as to the instantiating unit 36.

The first interface 28 is thus a communication interface. It is more particularly an interface via which the access handling device 20 receives application information cards with application requirement data. It is therefore also a communication interface for obtaining application requirement data.

Figure 3:
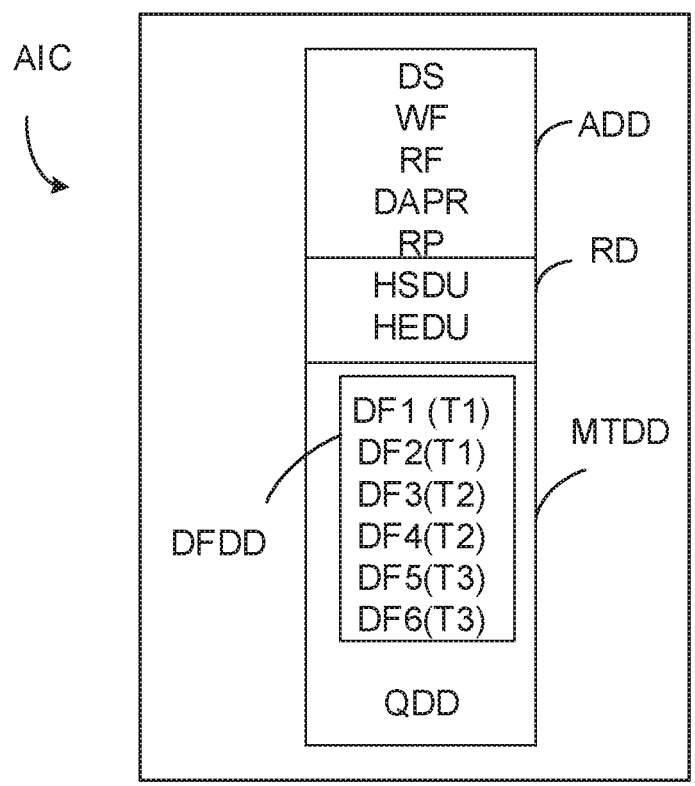

FIG. 3 schematically shows the content of an application information card AIC, which may be an electronic file with data having been set by a user of an application. The application information card AIC comprises application requirement data related to database usage. It does for instance comprise Access Defining Data (ADD). As an example the access defining data comprises an indication of data size DS, an indication of writing frequency WF, for instance per hour, an indication of a reading frequency RF, perhaps also per hour, an indication of the amount of data transferred per request DAPR, and retention period RP. It should be realized that also other access defining data may be included such as a fault tolerance level, expected response time and expected cost.

The application information card AIC may also comprise relational data RD, which is information about if the database is to have relations to other entities, such as whether historic data is used i.e. an indication of historic data usage HSDU as well as information about whether hierarchical data is used, i.e. an indication of hierarchical data usage HEDU.

The application information card may furthermore comprise model type defining data MTDD. The model type defining data MTDD may comprise data field defining data DFDD, i.e. information about data fields DF that are to be used in a database application, such as the name of the field as well as information about the type of data T in it. The data field defining data thereby comprises field names with type definitions. It is possible that the field data also comprise a short description of the context of the field.

As an example the data field defining data DFDD of the application information card AIC in FIG. 3 comprises information about a first data field DF1 having a first data type T1, which is indicated as DF1(T1), a second data field DF2 having the first data type T2, which is indicated as DF2(T1), a third data field DF3 having a second data type T2, which is indicated as DF3(T2), a fourth data field DF4 having the second data type T2, which is indicated as DF4(T2), a fifth data field DF5 having a third data type T3, which is indicated as DF5(T3) and a sixth data field DF6 having the third data type T3, which is indicated as DF6(T3).

The model type defining data MTDF in the application information card AIC may furthermore comprise query design data QDD, which query design data QDD comprises information on the structure of queries used by the application. The query design data QDD may furthermore comprise logical relationships between data fields that are to be provided in the database.

Figure 4:
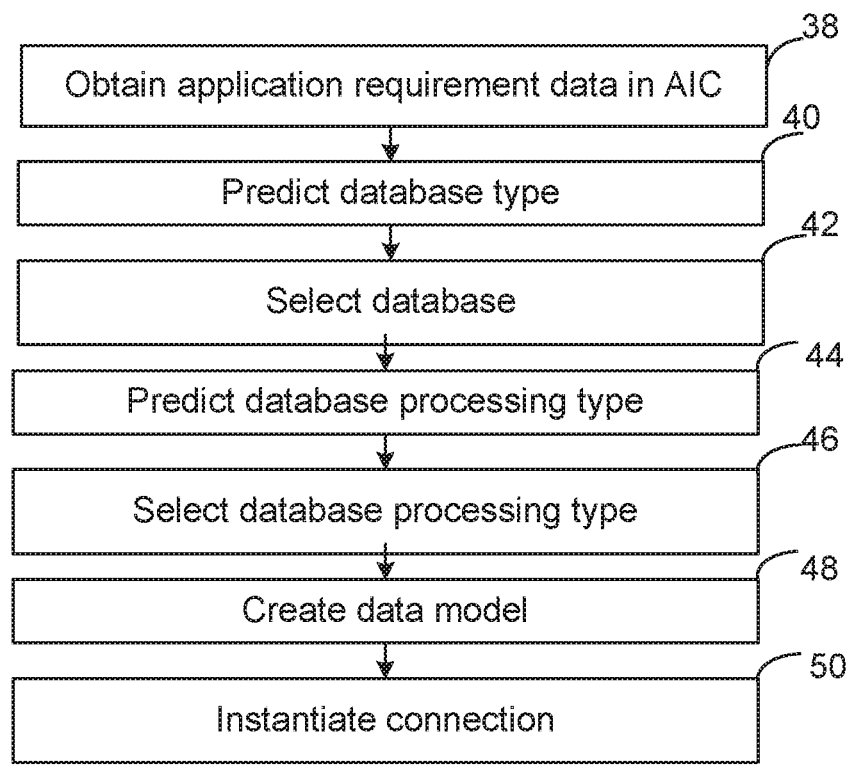
FIG. 4 shows a flow chart of a first embodiment of a method of selecting data storage settings for an application in a federated database system.

Now a first embodiment of the invention will be described with reference being made to FIG. 1-3 s well as to FIG. 4, which shows a flow chart of a number of method steps being performed by the access handling device 20 in a method of selecting data storage settings for an application in a federated database system.

When deploying an application in the federated database system, there are a number of settings that have to be made in order for the application to function acceptably.

Each application requires a different processing type and a different database to suit its needs. For example, analytical applications with large data require the Online Analytical Processing (OLAP) kind of data processing in a distributed database such as HBase, whereas applications with continuous data streams require Online Transaction Processing (OLTP) kind of data processing. It is highly important to determine the proper kind of data processing and database for an application to efficiently store and retrieve data.

Databases provided are often of the type structured query language (SqL) and NoSqL With the growth in data size, it is necessary to migrate to distributed NoSqL kind of databases like HBase, to handle big data efficiently. Hence, it is important for a federated database system to comprise both SqL and NoSqL databases to suit different application needs.

Data modelling is also highly important for the efficiency of applications. The conceptual, logical and physical model of an application should be carefully designed based on the underlying database.

In a federated database system, it is complex to determine the best data processing type, database and automatically define the data model based on the characteristics of the application specified in natural language.

Such settings have therefore so far been made manually, which is both time consuming and expensive.

There does thus not exist any current solution for automatically selecting the most suitable database for an application in a federated database system. Current recommendation systems do also not automatically suggest/select the best data processing type (like OLAP,OLTP etc.,) for an application. Natural Language Processing (NLP) is furthermore not currently used to automatically define the data model of a system based on the application characteristics specified in natural language. In current federated database systems, there is no mechanism for automatic deployment of applications.

Aspects of the invention are based on the concept of automatically selecting the best data processing type and database type and to automatically define the conceptual, physical and logical data model of an application based on its characteristics provided by a user of the application.

In order to be able to perform the activities described here a user of an application, such as an application designer, fills in an application information card AIC. The card may be an electronic file comprising natural language such as word processor file or a text file. As an alternative the application information card AIC may comprise a table where each field that may be filled in by the user is dedicated to one specific setting, which setting is thereby known to the access handling device 20. The application information card AIC may be a questionnaire where the application developer fills in information about the characteristics of application and the type/pattern of queries generated by the application.

An empty application information card may as one example be sent from the application handling device 20, for instance from the database determining unit 30, to the first data handling device 12 which harbours the first application. The application developer may then fill the card with access defining data ADD such as data size, retention period, writing frequency, reading frequency etc. as well as possibly also with relational data RD such as whether historic data and/or hierarchical data is used. The user may also enter model type defining data MTDD, for instance data field defining data DFDD such as field and data type descriptions and/or query design data QDD. As yet another option the questionnaire may be a web based questionnaire, where the user is asked questions and provides answers.

Once the user has filled in the application information card AIC or provided input to a function which generates the application information card AIC. The application information card AIC is then provided to the access handling device 20. It may be sent from the first data handling device 12. However it should be realized that it may be sent from any other computer to the access handling device 20. As yet another alternative the application information card AIC may be provided from the user to a web portal of a database administrator, from where it may be forwarded to the access handling device 20.

The method therefore starts with the access handling device 20 obtaining, via the first interface 28, application requirement data provided in the application information card AIC, step 38. The application information card AIC may here be provided to each of the database determining unit 30, processing type determining unit 32, and data model creating unit 34. As an alternative it may be provided to a natural language decoder, which may comprise an natural language processor (NLP) for processing the card and extract the access defining data ADD data and relational data RD and provide to the data base determining unit 30 as well as to the processing type determining unit 32. It may also provide the model type defining data MTDD to the data model creating unit 34.

If there is no separate natural language decoder, the database determining unit 30 may comprise one that decodes the data. After having obtained the access defining data ADD and optionally also relational data RD, the database determining unit 30 then predicts database type, step 40.

The prediction of database type made by the database determining unit 30 may be performed using a classifier, like a probabilistic classifier, for instance a Bayesian classifier. However, the classifier used is not limited to this type. Any type of classifier may be used.

The prediction may more particularly comprise using the application requirement data in the classification, like for instance using the access defining data ADD and possibly also the relational data RD for obtaining a probability linked to database type. Thereafter the database determining unit 32 selects database based on the database type prediction, step 42, which selection may comprise selecting a database of a type having the highest probability. The database may as an example be an Hbase database. The database determining unit 32 may thereby automatically select the best suited database based on the information provided in the application information card by the application developer.

Information about the selected database is also provided to the instantiating unit 36.

The processing type determining unit 32 also obtains the access defining data ADD and the optional relational data RD and uses this for determining processing type. For this reason, also the processing type determining unit 32 may comprise a natural language decoder for decoding that data of the application information card. However, if there is a separate such natural language decoder, this decoder may provide the access defining data ADD and possible relational data RD to the processing type determining unit 32. It is also possible that if there is a natural language decoder in the database determining unit 30, this could provide the access defining data ADD and the optional relational data RD to the processing type determining unit 32.

Thereafter the processing type determining unit 32 predicts database processing type based on the application requirement data, step 44. This may be done in the same way as the database determining unit 30 performs predictions, i.e. using a classifier such as probabilistic classifier like a Bayesian classifier on access defining data ADD and optional relational data RD.

The prediction may more particularly comprise using the application requirement data in the classification, like for instance using the access determination data ADD and optional relational data RD for obtaining a probability linked to database processing type. The classifier thus employs variables that are based on the application requirement data. Thereafter the processing type determining unit selects processing type based on the processing type prediction, step 46, which selection may comprise selecting the processing type for which the highest probability is obtained. The processing type may for instance involve selecting OLAP processing. The processing type determining unit 32 then informs the instantiating unit 36 of the determined processing type. The processing type determining unit 32 may thereby automatically select the data processing type (like OLAP,OLTP etc.,) based on the information provided in the application information card AIC by the application developer.

The data model creating unit 34 creates a database model, which may be done based on model type defining data MTDD such as data field defining data DFDD and/or query design data QD. Also the data model creating unit 34 may comprise a natural language decoder for decoding that data of the application information card. However, if there is a separate such natural language decoder, this decoder may provide the model type defining data MTDD to the data model creating unit 34. If such a natural language decoder is provided in the database determining unit 30 or the processing type determining unit 32 such a decoder may likewise provide the model type defining data MTDD to the data model creating unit 36.

Thereafter the data model creating unit 34 creates a data model to be used by the selected database, step 48. If based on data field defining data DFDD, the creation may involve clustering of the field names DF according to type definitions T and creating a table for each cluster. It may instead or additionally involve analysing the query design data QDD and create logical relations between fields described in the query design data QDD. The selected data model, for instance grouped according to number of tables and fields in tables is then provided to the instantiating unit 36. The data model creating unit 34 thereby automatically defines the conceptual, physical and logical model of the application based on the information provided in the application information card AIC by the application developer.

The instantiating unit 36, then instantiates a connection between the application and the selected database based on the selected database processing type and data model, step 50. This may be done through connecting to the selected database, as an example the first database 22, and instructing it to form tables according to the determined data model. The instantiating unit 36 also informs the access handling unit 35 of the type of data processing to be used as well as what database has been selected for the application in question, here the first database 22 and the first application A1. The instantiating unit 36 may possibly also inform the access handling unit 35 of the data model.

The access handling unit 35 thereafter takes care of the data transfer between the application A1 and the selected database 22. As a part of this data transfer it also takes care of storing, via the second interface 37, the data in the selected database using the selected data processing type.

The instantiating unit 36 and the access handling unit 35 together form a common data layer for taking care of the instantiation of connection and data transfer between the application and the selected database. This layer also takes care of storing the data in the selected database using the selected data processing type. In this way data storage settings have been selected for the application.

The first embodiment has a number of advantages. The manual overhead in defining the data model of an application may be reduced. It is easy to deploy the application in the federated database setup. The application developer need not worry about the database and the data transfer as it is entirely taken care of by the access handling device. Applications with different needs can be supported by a single federated data base system. Runtime efficiency of applications may be high because the most suitable database and data processing type is suggested/used by the federated database system. Connection management between application and database is abstracted from the application by the access handling unit. Even Business experts can deploy new applications without much technical knowledge of deployment. Due to evolution of data of an application, if the current database used by the application in the federated database system is no longer efficient for the application, it can be easily and seamlessly redeployed with a new database.

The order in which processing being made by the database determining unit, process type determining unit and data model determining unit was above described sequentially. It should be realized that sequential operation of these units is in no way any requirement. They may for instance operate in parallel. Furthermore if they are operating sequentially, then the order in which they operate may be varied.

Also if the application information card is provided in the form of a table, then there may be a table entry extractor instead of an NPL processor, which extractor extracts the data of a field in the table and provides to the unit that processes the type of data in the field. In this case there is no need of decoding. The type of data in the field may be known in advance.

Figure 5:
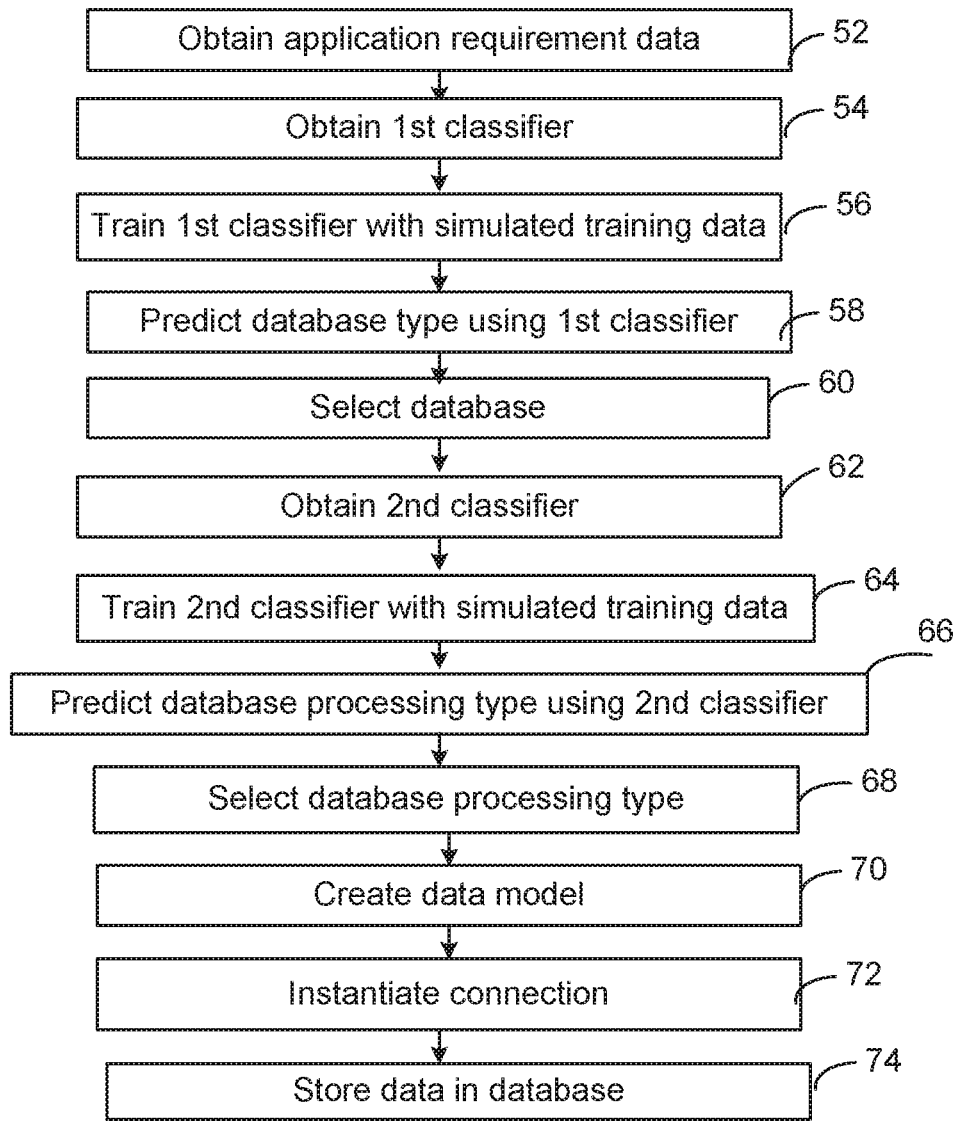
FIG. 5 shows a flow chart of a second embodiment of a method of selecting data storage settings for an application in a federated database system, and FIG. 6 schematically shows a computer program product comprising a data carrier with computer program code for implementing the method of selecting data storage settings for an application in a federated database system.

Now a second embodiment will be described with reference being made to FIG. 1-3 as well as to FIG. 5, where FIG. 5 shows a flow chart of a second embodiment of a method of selecting data storage settings for an application in a federated database system.

When a new application is deployed, the application developer fills the application information card AIC for the application.

As before the access handling device 20 obtains application requirement data in the form of the application information card AIC from the application developer, step 52.

This obtaining may be performed via the first interface 28 in any of the above described ways. The access defining data ADD and the relational data RD is then, perhaps after extraction for instance using a natural language decoder, provided to the database determining unit 30 as well as to the processing type determining unit 32, while model type defining data MTDD is provided to the data model creating unit 34.

The database determining unit 30 then obtains a first classifier, step 54. In this example it obtains a probabilistic classifier, which in this embodiment is a Bayesian classifier.

The types of data obtained via the access defining data ADD and relational data R in the application information card AIC are then used as input to obtain training data. The training data that is obtained is thus data of the types that are provided in the access defining data ADD and optional relational data RD. The data base determining unit 30 obtains simulated data from experts with all possible combination of values for all types of access defining data ADD and relational data RD appearing in the application information card AIC for each type of database.

This means that as the access information card AIC comprised the access defining data size DS, writing frequency WF, reading frequency RF, the amount of data transfer per request DAPR and retention period RP, simulated data of these types are obtained from experts in all possible ranges for all possible database types. The same is true for the relational data RD historic data usage HSDU and hierarchical data usage HEDU. However, these latter are Boolean and thus only of the yes/no type. The training data is then used to train the first classifier for each possible type of database, step 56. Conventional techniques like cross validation may also be used to test the model.

Thereafter the first classifier is used for predicting database type. For this reason the values of the access defining data ADD and relational data RD in the application information card AIC are provided to the first classifier to predict the most suited database for the application, step 58.

If for instance the data is formatted in the following way A1, DS, WF, RF, DAPR, RP, HSDU, HEDU, then $$p(C|F_1 \ldots F_n) = p(C) \overset{n}{\underset{i=1}{X}} p(F_i|C). \quad (1)$$

may be used, where C is a class variable, here database type, and F1-Fn are the above mentioned variables DS, WF, RF, DAPR, RP, HSDU and HEDU.

The above mentioned equation is used for each database. It can in this way be seen that the first classifier obtains one probability value p for each database type. The database determining unit 30 then determines or selects a database based on these probabilities, step 60. It may as an example select a database of a database type that has the highest probability. For example if the data size is huge (say 100 GB), write frequency/read frequency is high, then the most suitable database would be an HBase.

The database determining unit 30 then informs the instantiating unit 36 about the selected database.

The processing type determining unit 32 also determines the data processing type, which may be done in a similar way.

The processing type determining unit 32 may do this through obtaining a second classifier, step 62. In this example it also obtains a probabilistic classifier, which in this embodiment is also a Bayesian classifier.

The obtained access defining data ADD and relational data RD in the application information card AIC is then used to obtain training data. The processing type determining unit 32 thus also obtains simulated data from experts with all possible combinations of values for all types of access defining data ADD and relational data RL in the application information card AIC for each type of processing.

This means that also here the data size DS, writing frequency WF, reading frequency RF, amount of data transfer per request DAPR, retention period RP, historic data usage HSDU and hierarchical data usage HEDU are employed by the classifier. The training data is then used to train the classifier for each possible type of data processing, step 64. Conventional techniques like cross validation may also here be used to test the model.

Thereafter the second classifier is used for predicting processing type. For this reason the values of the access defining data ADD and relational data RD of the application information card AIC are provided to the second classifier to predict the most suited database for the application, step 66.

Yet again the same equation may be used $$p(C|F_1 \ldots F_n) = p(C) \overset{n}{\underset{i=1}{X}} p(F_i|C). \quad (1)$$

where C is a class variable, in this case processing type, and F1-Fn are the above mentioned variables DS, WF, RF, DAPR, RP, HSDU and HEDU.

A probability is then determined for each processing type. The processing type determining unit 32 then determines one processing type to be used based on these probabilities. It may as an example select the processing type having the highest probability. If, for example, historic data and hierarchical data are not used and read frequency is high with slicing and dicing of data, then OLAP is the best data processing type.

Thereafter the processing type determining unit 32 informs the instantiating unit 36 about the selected processing type.

Once the database type and data processing type for the application have been selected, the values from the current application information card AIC can be appended to the training set of the model used by the classifier for retraining to improve the accuracy of the model. This can be done in respect of both the first and second classifiers.

It is also possible to append more variables containing information about the application to the training set for efficient classification.

In order to determine a data model, the model type defining data MTDD is provided to the data model creating unit 34, which uses this data for creating a data model, step 70.

The model type defining data MTDD of the application information card AIC comprised data field defining data DFDD, such as field names DF, data-type T of each field name and perhaps a short description about the field, where all this information was supplied by the application developer.

In one variation of the operation of the data model creating unit 34, this unit 34 here groups together similar fields using conventional clustering techniques like k-means. There are many ways to use clustering, like k-means to group similar fields. One exemplifying way is to group field names with similar data-type together, such as for instance grouping all integer variables together and string variables together.

If it is assumed that the application A1 is a telecom application for which the database type selected is MySqL, the first data field DF1 may be a data field like customer_name, for which the first type T1=String. Suppose also that the second data field DF1 is address and also of the first type T1=String, the third field DF3 is, msisdn (Mobile Station International Subscriber Directory Number) of the second data type T2=number, the fourth field DF4 is account_balance and also of the second type T2=number, the fifth field DF5 is activation_date and the third type T3=date and finally the sixth field sDF6, creation_date also of the third type T3=date.

In this example, name and address fields DF1 and DF2 have the same data type T1=string. So they can be grouped together. Similarly, msisdn and account_balance DF3 and DF4 are fields with same datatype T2=integer(number). Hence, they can be grouped together. If such a method of clustering similar fields using K-Means is performed, three clusters may be obtained.

Cluster 1: DF1, DF2 (T1)
Cluster 2: DF3, DF4 (T2)
Cluster 3: DF5, DF6 (T3)

Hence, the data model creating unit 34 may create three tables, where the fields in clusters are in table 1, the fields in cluster 2 are in table 2 and the fields in cluster 3 are in table 3.

It is furthermore possible that the third field DF3, msisdn, could be a primary/foreign key if the application developer has specified in the application information card AIC that DF3, msisdn, is a unique field. Such a specification may therefore also be a part of the model type defining data. If the recommended database is HBase for the above mentioned example, then all fields grouped together in a single table may have msisdn as row key.

Similar fields can be also be grouped together based on the description of fields in the application information card AIC. The data model creating unit 34 may apply conventional NLP techniques to group similar fields based on description of fields.

After having determined the tables in the above-described way, the data model creating unit 34 may inform the application developer before they are actually deployed. The data model creating unit 34 may therefore send information to the first data handling device 12 for being presented via a display of that device.

In the above mentioned example, three tables are suggested by the data model creating unit 34. Hence, the structure of three tables would be displayed to the application developer as follows.
Table 1: DF3=msisdn(primary key), DF1 (T1)=customer_name(String), DF2(T1) address(String)
Table 2: DF3=msisdn(Foreign key), DF4(T3) account_balance(number)
Table 3: DF3=msisdn(Foreign key), DF5(T3)=activation_date(date), DF6(T3)=creation_date (date)

iT can thus be seen that the data model creating unit 34 clusters the field names according to type definitions and creates a table for each cluster.

The application developer may then make changes if required to the tables. For example, the application developer can name the tables or merge tables 1 and table 2 into a single table. The choice of the application developer is then returned to the data model creating unit 34.

Once the application developer has approved the scheme, the data model creating unit 34 then informs the instantiating unit 36. A deployment process may then be started by the instantiating unit 36. Precoded intelligence may be present in the instantiating unit 36 to instantiate the tables in the selected database.

The data model creating unit 34 may also use another scheme for determining the data model.

In a second variation implementing this scheme, the data model creating unit 34 uses query design data QDD in the application information card AIC.

The query design data QDD may comprise information about the querying pattern/queries. The most frequently used queries can be a useful information for designing the data model of an application. For example, assume that "select * from table" is one of the most frequently used queries, then grouping the entire information in a single table, or grouping the information in minimal number of tables would be more efficient.

If as an example it is assumed that the first application A1 has data fields name (String), id (number) and age (number). If it is also assumed that the query design data QDD also comprises the following query, which is also the most frequently used query for the application A1.
Q1: Select x_name FROM table-x as x INNER JOIN Table-y AS y y.id=x.id WHERE y.age=25;

This query Q1 gives vital information about the data model. It says that Table-X should have name with id as primary key and Table y should have age with id as foreign key. This makes the process of designing the data model easier. Hence the data model for this application would be as follows.
Table-x: Name (String), id (number) (primary key)
Table-y: Age(number), id(number) (Foreign key)

Frequently used queries can thus make the process of data model definition easier and more accurate.

It can in this way be seen that that data model creating unit 34 has created tables according to logical relationships between fields described in the query design data QDD.

Data models of applications can furthermore be stored in the data model creation unit. This information can later be reused to define data models of applications with similar characteristics.

The instantiating unit 36 thereafter instantiates a dedicated connection between the application A1 in the application layer AL and the selected database 22 in the database layer DL based on the data processing type and selected data model, step 72. The instantiating unit 36 more particularly connects to the selected database o and instructs it to form tables of the selected data model. The instantiating unit 36 furthermore informs the access handling unit 35 of the selections of data processing type and data model.

Data transfer and data processing in the selected format is then taken care of by the access handling unit 35, step 74. It thus processes access requests, such as queries from the first application A1 using the selected data processing type and stores data in the tables of the selected database 22 using the instantiated data model and data processing type, step 74. The same principle may also be employed for fetching data.

The instantiating unit 36 and access handling unit 35 may together form a common layer through which all applications communicate to the corresponding databases.

It can in this way be seen that the database type, data processing type and data models have been determined and applied based on the information in the application information cards, which greatly simplifies the deployment of applications in the federated database system.

The access handling device may furthermore form a data storage setting arrangement. However, it is possible that the access handling unit is provided separately from the other units. Thus the database determining unit, processing type determining unit, data model creating unit and instantiating unit may be provided as a data storage setting arrangement, perhaps in the form of a separate device, communicating with a device comprising the access handling unit.

The data storage setting arrangement may be provided in the form of a processor with associated program memory including computer program code for performing the functionality of the data storage setting arrangement.

Figure 6:
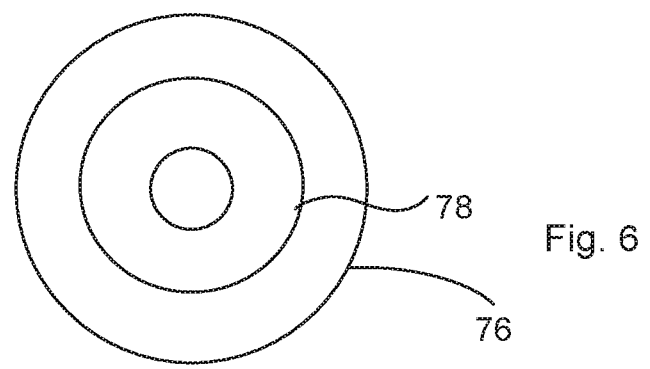

A computer program may also be a computer program product, for instance in the form of a computer readable storage medium or data carrier, like a CD ROM disc or a memory stick, carrying such a computer program with the computer program code, which will implement the functionality of the above-described data storage setting arrangement. One such data carrier 76 with computer program code 7786 is schematically shown in FIG. 6.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. An access handling device in a federated database system, the federated database system comprising data handling devices configured to store and fetch data in corresponding federated databases of the federated database system, the access handling device comprising:
a first communication interface configured to obtain application requirement data from a data handling device of the data handling devices of the federated database system, said application requirement data defining requirements of an application running on the data handling device to access one or more of the corresponding federated databases to store application data on one or more of the corresponding federated databases;

a second communication interface configured to communicate with the corresponding federated databases provided in a database tier of the federated database system;

at least one processor configured to:
  predict a federated database type required to store the application data based on a first probabilistic classification of said application requirement data;
  select a federated database of the corresponding databases based on the federated database type prediction;
  predict a federated database processing type required to store the application data based on a second probabilistic classification of said application requirement data;
  select a federated database processing type based on the federated processing type prediction;
  create a data model that stores the application data in the selected federated database based on the application requirement data,
  instantiate a connection between the application and the selected federated database based on the selected federated database processing type and the created data model, and
  responsive to the instantiation of the connection, transfer the application data received from the data handling device via the first interface to the selected federated database using the second interface and the created data model.

2. The access handling device according to claim 1, wherein said at least one processor is further configured to instantiate the connection by instructing the selected federated database to form tables according to the created data model to store the application data.

3. The access handling device according to claim 1, wherein the application requirement data comprises field names with type definitions.

4. The access handling device according to claim 3, wherein the at least one processor is further configured to:
  cluster the field names according to type definitions; and
  create a table for each cluster.

5. The access handling device according to claim 3, wherein the application requirement data comprises query design data; and the at least one processor is further configured to:
  create tables according to logical relationships between fields described in the query design data.

6. The access handling device according to claim 1, wherein the application requirement data comprises access defining data.

7. The access handling device according to claim 1, wherein the access handling device is configured to operate in a data grid tier of the federated database system.

8. The access handling device according to claim 1, wherein the at least one processor is further configured to predict the first and second classifications using natural language processing (NLP).

9. A method of selecting data storage settings for an application in a federated database system, the federated database system comprising data handling devices configured to store and fetch data in corresponding federated databases of the federated database system, the method performed in an access handling device of the federated database system and comprising the steps of:
  obtaining, via a first communication interface of the access handling device, application requirement data from a data handling device of the data handling devices of the federated database system, said application requirement data defining requirements of an application running on the data handling device to access one or more of the corresponding federated databases to store application data on one or more of the corresponding federated databases,
  predicting a federated database type required to store the application data based on a first probabilistic classification of said application requirement data,
  selecting a federated database of the corresponding databases based on the federated database type prediction,
  predicting a federated database processing type required to store the application data based on a second probabilistic classification of said application requirement data,
  selecting a federated database processing type based on the federated processing type prediction,
  creating a data model that stores the application data in the selected federated database based on the application requirement data,
  instantiating a connection between the application and the selected federated database based on the selected federated database processing type and the created data model, and
  responsive to instantiating the connection, transferring, via a second interface of the access handling device, the application data received from the data handling device via the first interface to the selected federated database using the created data model.

10. The method according to claim 9, further comprising training the classifier using simulated training data wherein instantiating the connection comprises instructing the selected federated database to form tables according to the created data model to store the application data.

11. The method according to claim 9, wherein the application requirement data comprises field names with type definitions.

12. The method according to claim 11, wherein the creating of the data model comprises clustering the field names according to type definitions and creating a table for each cluster.

13. The method according to claim 11, wherein the application requirement data comprises query design data; and
  wherein the creating of the data model comprises creating tables according to logical relationships between fields described in the query design data.

14. The method according claim 9, wherein the application requirement data comprises access defining data.

15. A computer program product comprising a non-transitory computer readable storage medium of an access handling device of a federated database system, the non-transitory computer readable storage medium storing computer program code that selects data storage settings for an application in the federated database system, the federated database system comprising applications configured to handle data in corresponding federated databases of the federated database system, the computer program comprising computer program code which when executed by at least one processor coupled to said non-transitory computer readable medium, causes the at least one processor to:

obtain, via a first communication interface of the access handling device, application requirement data from a data handling device of the data handling devices of the federated database system, said application requirement data defining requirements of an application running on the data handling device to access one or more of the corresponding federated databases to store application data on one or more of the corresponding federated databases, predict a federated database type required to store the application data based on a first probabilistic classification of said application requirement data, select a federated database of the corresponding databases based on the federated database type prediction, predict a federated database processing type required to store the application data based on a second probabilistic classification of said application requirement data, select a federated database processing type based on the federated processing type prediction, create a data model that stores the application data in the selected federated database based on the application requirement data, instantiate a connection between the application and the selected federated database based on the selected federated database processing type and the created data model, and responsive to the instantiation of the connection, transfer, via a second interface of the access handling device, the application data received from the data handling device via the first interface to the selected federated database using the created data model.

* * * * *